US012078468B2

(12) United States Patent
Atchison et al.

(10) Patent No.: US 12,078,468 B2
(45) Date of Patent: *Sep. 3, 2024

(54) MOBILE DEVICE BUILDING LAYOUT DETERMINATION SYSTEMS AND METHODS

(71) Applicant: Johnson Controls Technology Company, Auburn Hills, MI (US)

(72) Inventors: Shaun B. Atchison, Wichita, KS (US); Jedidiah O. Bentz, Wichita, KS (US); John W. Uerkvitz, Valley Center, KS (US); Aneek M. Noor, Wichita, KS (US); Drew H. Carlton, Wichita, KS (US); Andrew M. Boyd, Wichita, KS (US); Brian D. Rigg, Douglass, KS (US); Shawn A. Hern, Park City, KS (US); Noel A. Grajeda-Trevizo, Newton, KS (US); Cody J. Kaiser, Wichita, KS (US); Tom R. Tasker, Andover, KS (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 197 days.

This patent is subject to a terminal disclaimer.

(21) Appl. No.: 17/352,673

(22) Filed: Jun. 21, 2021

(65) Prior Publication Data

US 2021/0310792 A1 Oct. 7, 2021

Related U.S. Application Data

(63) Continuation of application No. 15/966,820, filed on Apr. 30, 2018, now Pat. No. 11,041,712.
(Continued)

(51) Int. Cl.
*G01B 11/00* (2006.01)
*F24F 11/52* (2018.01)
(Continued)

(52) U.S. Cl.
CPC ............ *G01B 11/005* (2013.01); *F24F 11/52* (2018.01); *G01C 15/002* (2013.01);
(Continued)

(58) Field of Classification Search
CPC .. G01B 11/005; G01B 11/026; G01C 15/002; G06F 3/0488; G06F 3/0482;
(Continued)

(56) References Cited

U.S. PATENT DOCUMENTS 7,013,234 B1 * 3/2006 Olmsted ................ G01C 22/00
701/438
8,547,798 B2 10/2013 Chatterjee
(Continued)

FOREIGN PATENT DOCUMENTS

EP 2269019 B1 8/2013
JP 2002031530 A 1/2002
JP 2016130600 A * 7/2016

OTHER PUBLICATIONS

JP 2016-130600 A—English Translate, Jul. 21, 2016, 26 pp. (Year: 2016).*
(Continued)

*Primary Examiner* — Tung S Lau
(74) *Attorney, Agent, or Firm* — Fletcher Yoder, P.C.

(57) ABSTRACT

The present disclosure includes systems and methods for determining dimensions, shapes, and locations of rooms of a building using a mobile device for controlling heating, ventilation, and air conditioning (HVAC) provided to the rooms and building. A measuring device receives a shape of a room in the building and determines a dimension set of the room based on the shape of the room. The measuring device transmits the shape of the room and the dimension set to a mobile device that determines a layout of the building based on the shapes and the dimension sets corresponding to the
(Continued)

rooms of the building. In this manner, the systems and methods provide the layout of the building more efficiently, resulting in an improved HVAC system installation and operation process.

20 Claims, 10 Drawing Sheets

Related U.S. Application Data

(60) Provisional application No. 62/660,107, filed on Apr. 19, 2018.

(51) Int. Cl.
*G01C 15/00* (2006.01)
*G06F 3/0488* (2022.01)
*G06T 7/521* (2017.01)
*H04W 4/33* (2018.01)

(52) U.S. Cl.
CPC ............ *G06F 3/0488* (2013.01); *G06T 7/521* (2017.01); *H04W 4/33* (2018.02); *G06T 2207/10028* (2013.01)

(58) Field of Classification Search
CPC .................. G06F 3/0486; G06T 7/521; G06T 2207/10028; F24F 11/52; F24F 11/50; H04W 4/33
See application file for complete search history.

(56) References Cited

U.S. PATENT DOCUMENTS

| 8,989,440 | B2 | 3/2015 | Klusza et al. |
| 11,041,712 | B2* | 6/2021 | Atchison .................. F24F 11/52 |
| 2005/0114095 | A1* | 5/2005 | Guld ....................... G06F 30/13 703/1 |
| 2009/0079954 | A1 | 3/2009 | Smith et al. |
| 2009/0156232 | A1 | 6/2009 | Benco et al. |
| 2012/0203502 | A1 | 8/2012 | Hayes et al. |
| 2013/0144546 | A1 | 6/2013 | Brackney et al. |
| 2021/0073449 | A1* | 3/2021 | Segev ..................... G06F 30/27 |

OTHER PUBLICATIONS

Rosser et al., Modelling of Building Interiors with Mobile Phone Sensor Data, 2015, ISPRS Int. J. Geo-Inf. 4, pp. 989-1012 (Year: 2015).*
McGlinn et al., Usability Evaluation of a Web-Based Tool for Supporting Holistic Building Energy Management, 2017, Automation in Construction 84, pp. 154-165 (Year: 2017).*
Kashimoto, Yukitoshi, et al.; "A Floor Plan Creation Tool Utilizing a Smartphone with an Ultrasonic Sensor Gadget", 2016 13th IEEE Annual Consumer Communications & Networking Conference; 6 pages.

* cited by examiner

US 12,078,468 B2

MOBILE DEVICE BUILDING LAYOUT DETERMINATION SYSTEMS AND METHODS

CROSS REFERENCE TO RELATED APPLICATION

This application is a continuation of U.S. patent application Ser. No. 15/966,820, entitled "Mobile Device Building Layout Determination Systems and Methods," filed Apr. 30, 2018, which claims priority to and the benefit of U.S. Provisional Application No. 62/660,107, entitled "Mobile Device Building Layout Determination Systems and Methods," filed Apr. 19, 2018, which is hereby incorporated by reference in its entirety for all purposes.

BACKGROUND

The present disclosure generally relates to determining building layouts, and more particularly to determining dimensions, shapes, and locations of rooms of a building using a user interactive application on a mobile device for controlling heating, ventilation, and air conditioning (HVAC) provided to the rooms and building.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To facilitate tailoring operation of an HVAC system to a specific building, an installer or technician may determine layout of the building, for example, including the dimension, shape, and/or location of rooms in the building, and program or configure the HVAC system accordingly. That is, the installer may program zone operation the HVAC system to provide more airflow to larger rooms of the building. Additionally or alternatively, the installer may program the HVAC system to provide more airflow to rooms that are more likely to be occupied, such as bedrooms at night and/or common rooms during the day. However, measuring dimensions, such as the length, width, and/or height, of each room in the building may be a tedious and/or time-consuming process. Moreover, determining a building layout, for example, by reproducing the shape and location of each room in the building and associating the measured dimensions, may be a tedious and/or time-consuming process. Based on the building layout and/or purpose of the rooms in the building, the installer may adjust operation of the HVAC system, which, at least in some instances, may also be a tedious and/or time-consuming process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for determining building layout includes a measuring device that receives a shape of a room in a building. The measuring device also determines a dimension set of the room based on the shape of the room. The measuring device further transmits the shape of the room and the dimension set to a mobile device, wherein the mobile device determines a layout of the building based on the shape of the room and the dimension set.

In another embodiment, a method for determining building layout includes communicatively coupling to a measuring device disposed in a room a building. The method also includes receiving a respective shape of each room. The method further includes instructing the measuring device to measure a respective set of dimensions corresponding with each room based on the respective shape for each room. The method also includes generating a layout of the building based on each respective shape and each respective set of dimensions corresponding with each room. The method further includes controlling a heating, ventilation, and air conditioning (HVAC) system of the building based on the layout of the building.

In yet another embodiment, a tangible, non-transitory, machine-readable medium includes machine-readable instructions for determining building layout and executable by a processor of a device that, when executed by the processor, cause a processor to receive a respective selection of a respective shape of a respective room of a building. The instructions also cause the processor to receive a respective dimension of the respective room. The instructions further cause the processor to generate a layout of the building based on each respective shape and each respective dimension of each respective room. The instructions also cause the processor to control an HVAC system of the building based on the layout of the building.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
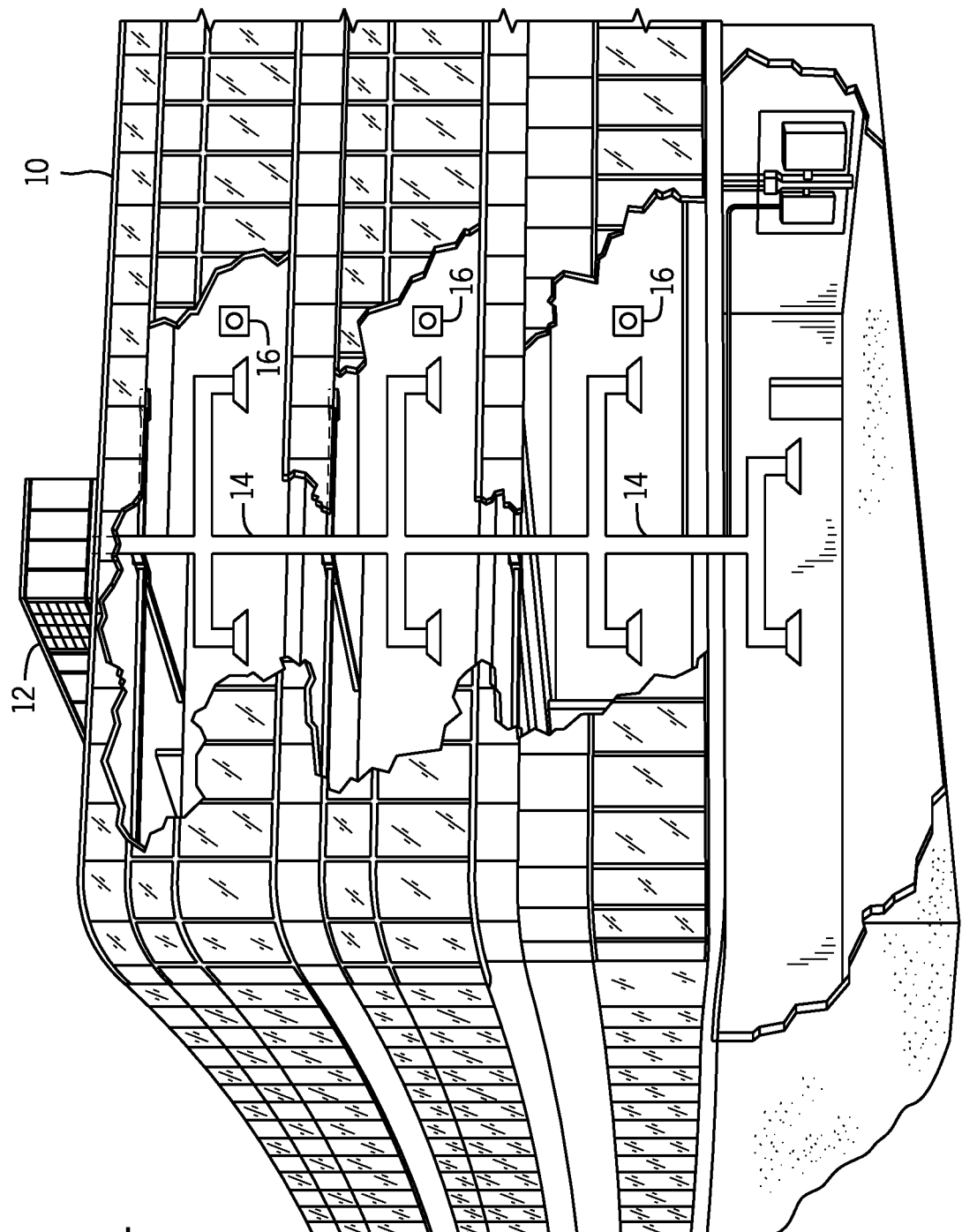
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Heating, ventilation, and air conditioning (HVAC) systems often utilize a control system to control the operation of devices or equipment within the HVAC system, for example, implemented via one or more control boards or panels. That is, a control board may receive input data or signals from one or more devices in the HVAC system, such as an interface device, a thermostat, a sensor, another control board, or any combination thereof. Additionally or alternatively, a control board may output control commands or signals that instruct one or more other devices in the HVAC system to perform control actions. For example, a control board may receive a temperature setpoint via a thermostat, compare the temperature setpoint to a temperature measurement received from a sensor, and instruct equipment in the HVAC system to adjust operation when the temperature measurement deviates from the temperature setpoint by more than a threshold amount.

Often, the control board of the HVAC system may provide different amounts of heating, ventilation, and/or air conditioning to different rooms or different zones of rooms of a building. For example, an HVAC system installer may instruct the control board to provide more heating, ventilation, and/or air conditioning to rooms or zones that are larger or have more cubic footage and less heating, ventilation, and/or air conditioning to rooms or zones that are smaller or have less cubic footage. Similarly, the HVAC system installer may instruct the control board to provide more heating, ventilation, and/or air conditioning to rooms or zones that are more likely to be occupied, such as common rooms during the day and/or bedrooms during the night, and less heating, ventilation, and/or air conditioning to rooms or zones that less likely to be occupied, such as common rooms during the night and/or bedrooms during the day.

The present disclosure provides techniques to facilitate improving determination of a layout of a building, including dimensions, shapes, and locations of rooms in the building, which is heated, ventilated, and cooled by the HVAC system. In some embodiments, a measuring device includes room dimension determination logic that receives shapes of rooms in the building and sensors that determine one or more measured dimensions of the rooms. A mobile device communicatively coupled to the measuring device may receive the shapes and/or dimensions of each room in the building and determine a layout of the building accordingly.

In some embodiments, the mobile device may be communicatively coupled to the HVAC system, thereby enabling operation of the HVAC system to be tailored or configured based on the layout of the building, for example, to provide more air, heating, and/or cooling to larger rooms or rooms that are more often occupied, such as common rooms during the day and/or bedrooms during the night. When the measuring device is not communicatively coupled to the mobile device, in some embodiments, the mobile device may instead determine shapes and/or dimension of the rooms via room dimension determination logic disposed therein. In this manner, the layout of the building may be provided more efficiently, which, at least in some instances, may facilitate improving HVAC system installation and/or operational efficiency of the HVAC system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12 or conditioned air unit. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may include a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and/or fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
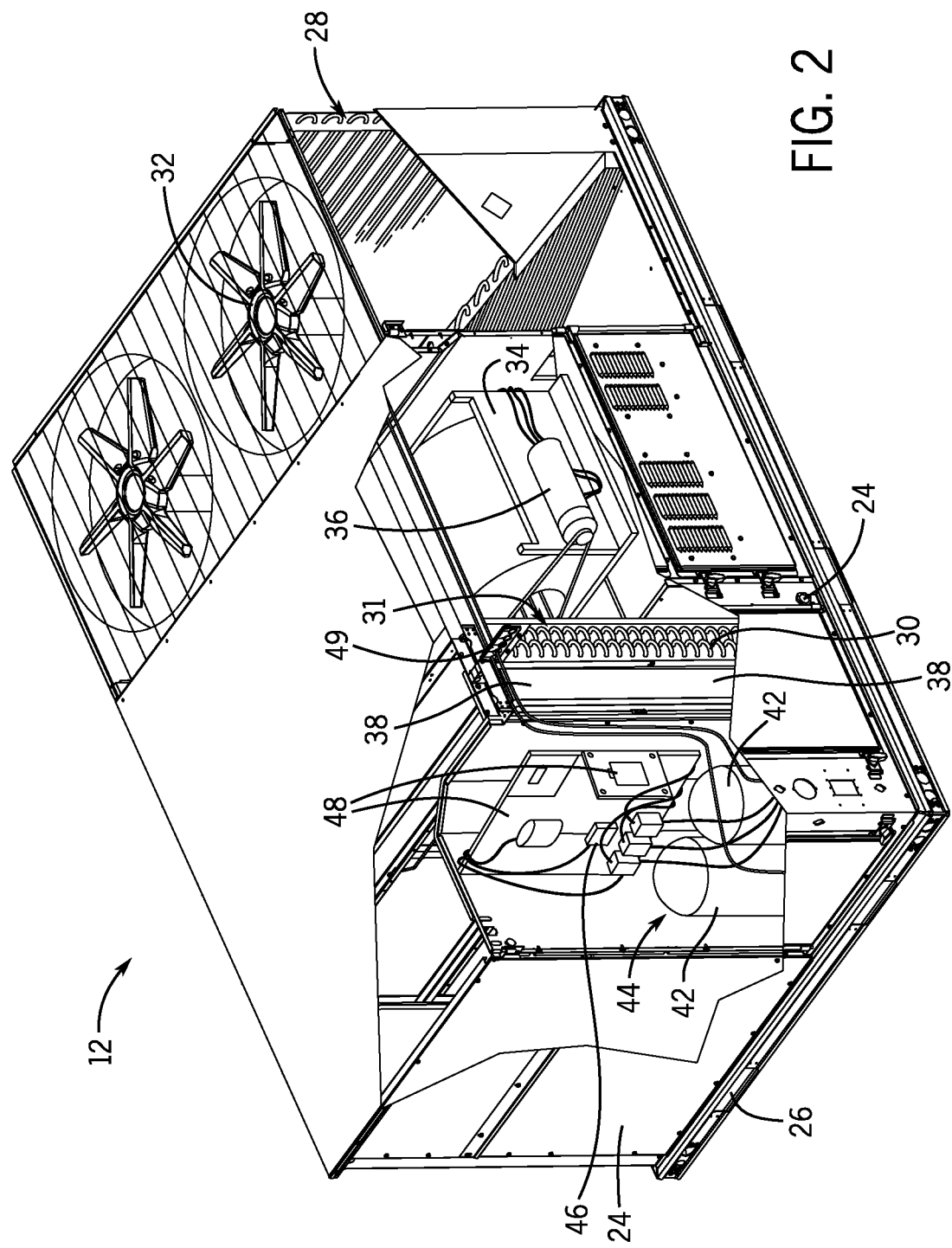
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12, for example, to provide structural support and/or to protect to internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. Air may be heated and/or cooled as the air flows through the heat exchanger 28 before being released back to the environment surrounding the rooftop unit 12. A blower assembly 34, powered by a motor 36, may draw air through the heat exchanger 30 to heat or cool the air. The heated or cooled air may be directed to the building 10 by the ductwork 14, which may be connected to the HVAC unit 12. Before flowing through the heat exchanger 30, the conditioned air may flow through one or more filters 38, for example, to remove particulates and/or contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and/or temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
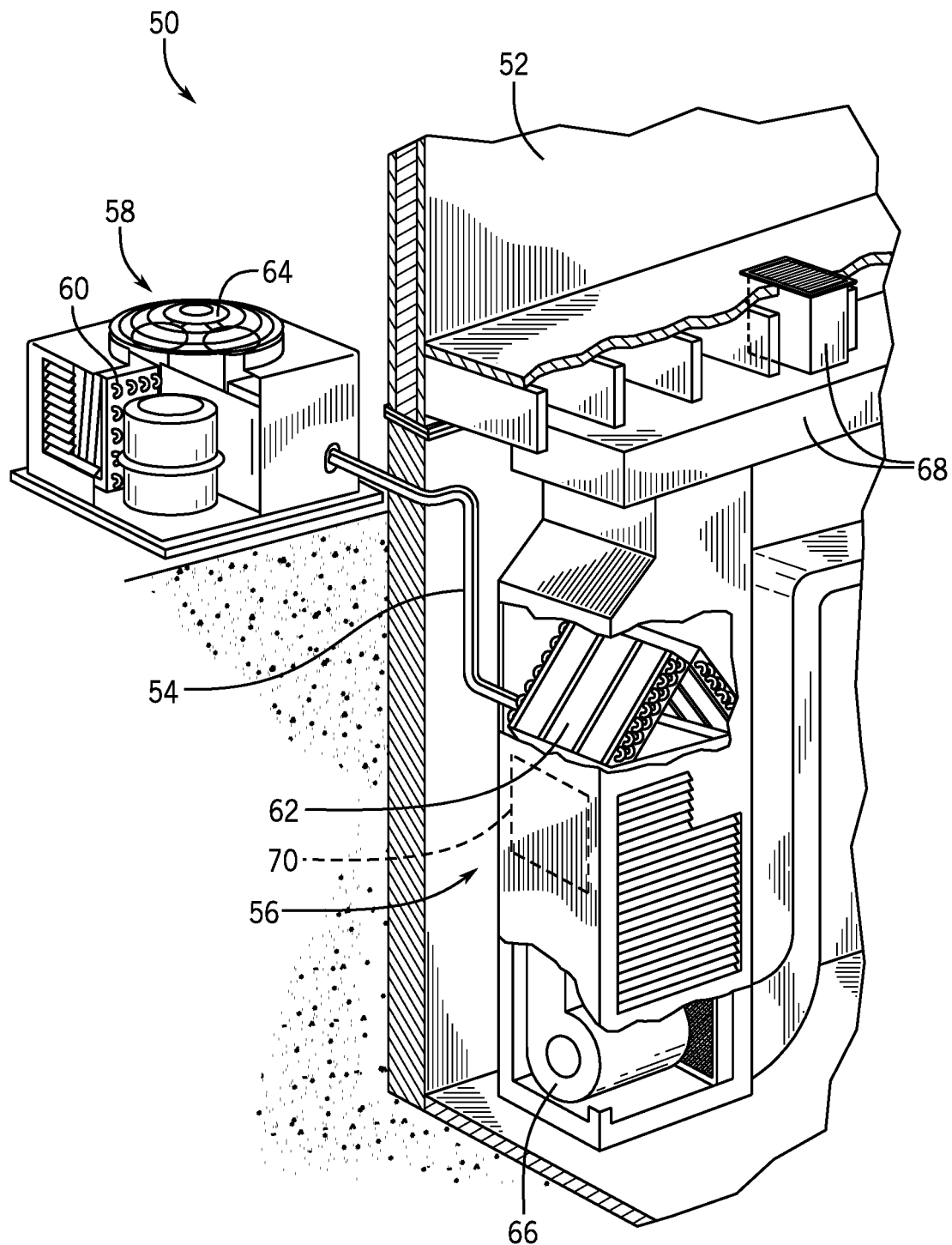
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated air to a residential structure, cooled air to the residential structure, provide outside air for ventilation, and/or improved indoor air quality (IAQ), for example, via devices, such as ultraviolet lights and/or air filters. In the illustrated embodiment, the residential heating and cooling system 50 is a split HVAC system. In general, a residence 52 conditioned by a split HVAC system may include refrigerant conduits 54 that operatively or fluidly couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud, for example, to protect the system components and/or to prevent leaves, other debris, or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 may serve as a condenser for re-condensing vaporized refrigerant flowing from the indoor unit 56 to the outdoor unit 58 via one of the refrigerant conduits 54. In these applications, a heat exchanger 62 of the indoor unit may function as an evaporator. Specifically, the heat exchanger 62 receives liquid refrigerant, which may be expanded by an expansion device, and evaporates the refrigerant before returning it to the outdoor unit 58.

The outdoor unit 58 may draw environmental air through the heat exchanger 60 using a fan 64 and expel the air above the outdoor unit 58. When operating as an air conditioner or cooling mode, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52.

The overall system operates to maintain a desired or target temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump or in heating mode. When operating as a heat pump, the roles of heat exchangers 60 and 62 are reversed. That is, the heat exchanger 60 of the outdoor unit 58 may serve as an evaporator to evaporate refrigerant, thereby cooling air entering the outdoor unit 58 as the air passes over the heat exchanger 60. The indoor heat exchanger 62 may receive a stream of air blown over it and heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
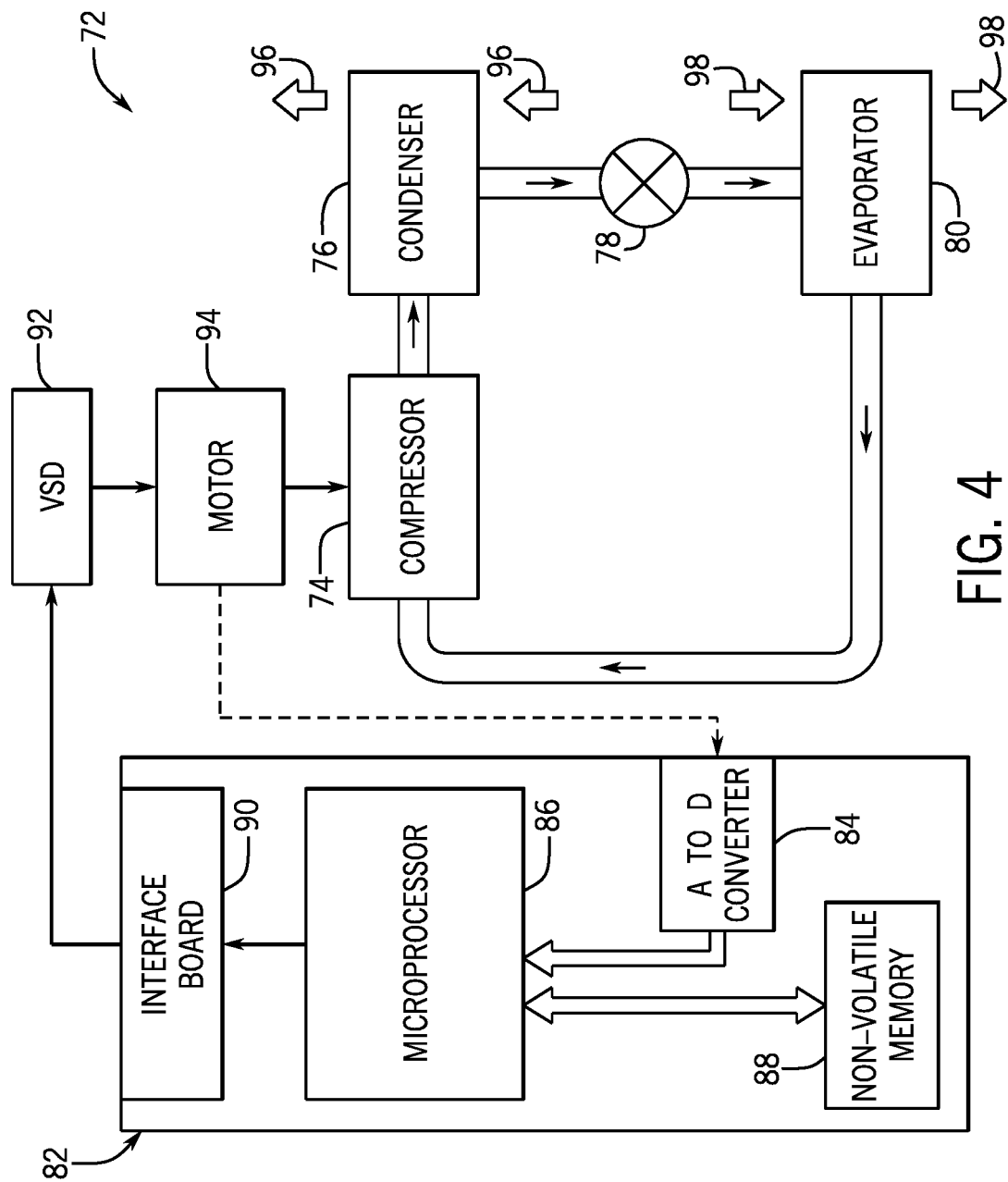
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, one or more expansion valves or devices 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback, for example, from an operator and/or sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source and output electrical power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 may compress a refrigerant vapor and deliver the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98, for example, when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in more detail below, app-enabled room and building dimension determination techniques may be implemented to improve HVAC system installation and operational efficiency.

Figure 5:
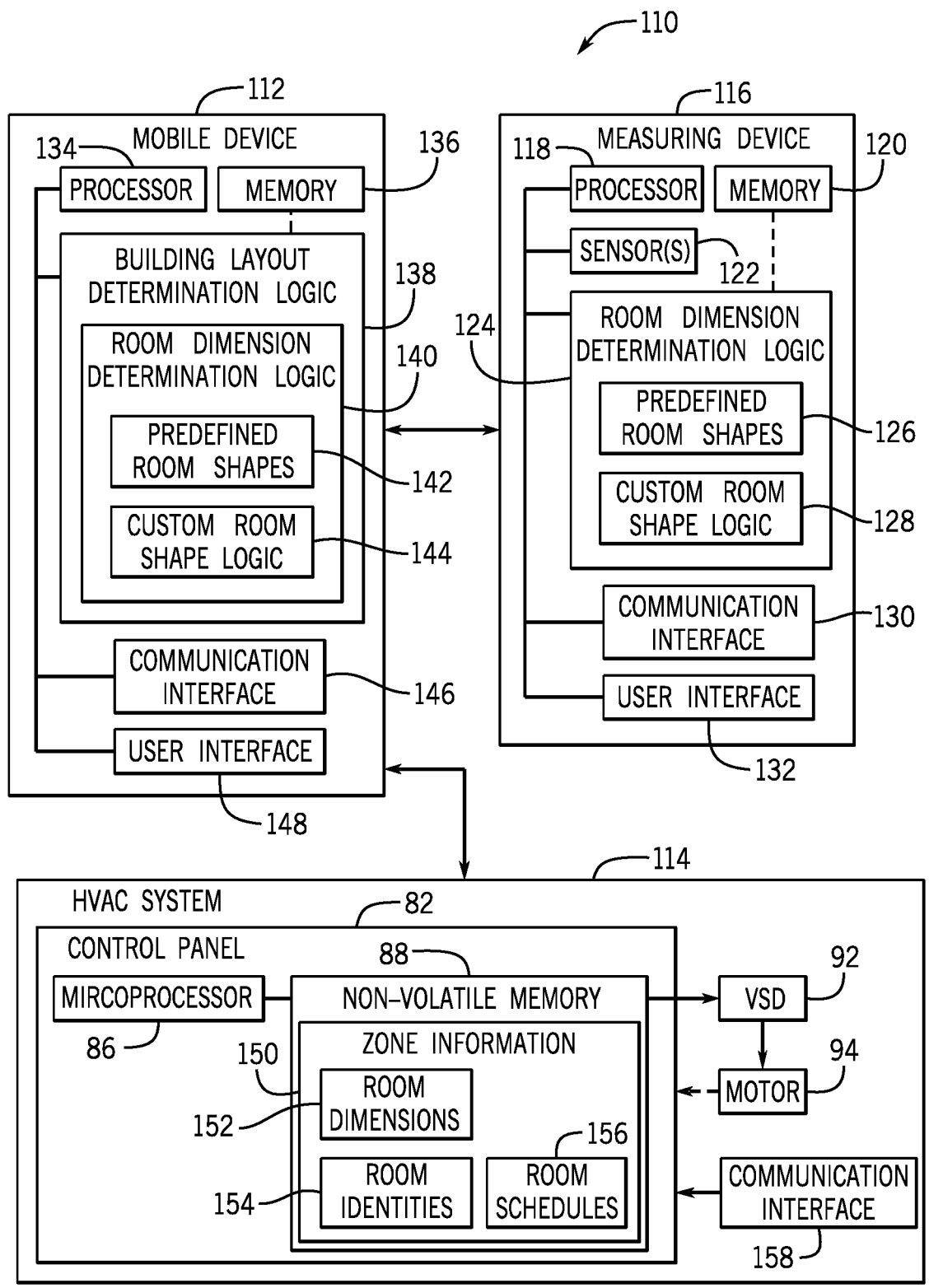
FIG. 5 is a block diagram of a measuring system that includes a measuring device and a mobile device, in accordance with an embodiment of the present disclosure.

To help illustrate, a block diagram of a system 110 that determines room and building dimensions via a mobile device 112 to facilitate operating an HVAC system 114 or conditioned air system is shown in FIG. 5. The system 110 may also include a measuring device 116 that determines dimensions of a room of a building in which it is deployed. As illustrated, the measuring device 116 may include a processor 118 and a memory 120 communicatively coupled to the processor 118. In some embodiments, the processor 118 may generally control operation of the measuring device 116, for example, by executing corresponding instructions stored in memory 120. In addition to storing executable instructions, in some embodiments, the memory 120 may store data to be processed by the processor 118.

The measuring device 116 may also include one or more sensors 122 communicatively coupled to the processor 118 that may enable the measuring device 116 to measure the dimensions of the room. In particular, the one or more sensors 122 may measure distance from the measuring device 116 to a surface, such as a wall, ceiling, or floor, of the room. For example, a sensor 122 may operate by sending a laser pulse towards the surface of the room and measuring the time it takes for take the laser pulse to be reflected off the surface and returned to the one or more sensors 122. While a laser sensor is described as an example of the one or more sensors 122, such sensors may use any suitable form of measurement that enables measuring the dimensions of the room, such as other forms of light, sonar or acoustic pulses, and/or the like.

Figure 6:
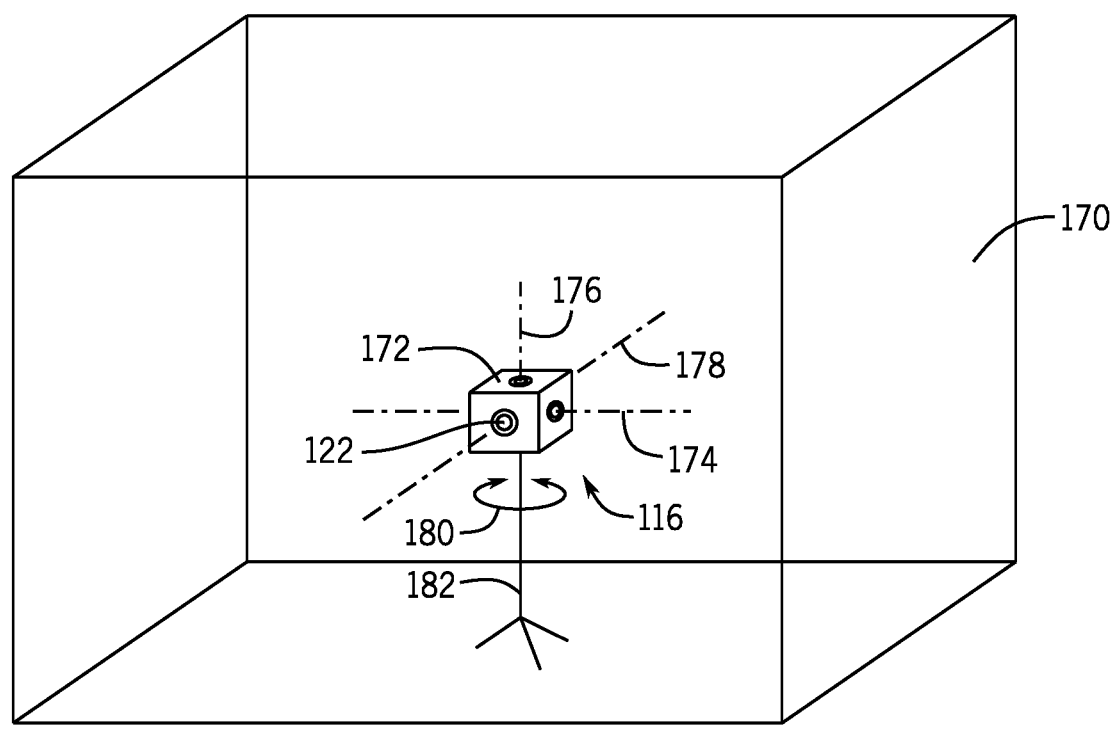
FIG. 6 illustrates an example of the measuring device of FIG. 5 deployed in a room, in accordance with an embodiment of the present disclosure.

FIG. 6 is a schematic diagram of an example of a measuring device 116, which may be implemented in the system 110 of FIG. 5, for determining dimensions of a room 170. As illustrated, per the Cartesian coordinate system, the measuring device 116 may include at least three sensors 122 on a sensor array 172, for example, such that a first sensor 122 sends laser pulses in an x-axis direction 174, a second sensor 122 sends laser pulses in a y-axis direction 176, and a third sensor 122 sends laser pulses in a z-axis direction 178. In some embodiments, the measuring device 116 may enable rotation 180, for example, in a plane of the x-axis 174 and the y-axis 176, of the sensor array 172 to enable convenient and accurate three-dimensional measurement of room dimensions. The measuring device 116 may include a mount 182 and, in some embodiments, automatically rotate the sensor array 172 about the mount 182, for example, based on user inputs received from the HVAC system installer via a user interface 132. Additionally or alternatively, the measuring device 116 may enable the HVAC system installer to manually rotate 180 the sensor array 172. To fully and accurately measure the dimensions of the room 170, in some embodiments, the measuring device 116 may enable automatically or manually adjusting the sensor array 172 to direct the three sensors 122 in opposite directions along the x-axis direction 174, the y-axis direction 176, and the z-axis direction 178.

To facilitate improving measurement efficiency, in some embodiments, the sensor array 172 may include at least six sensors 122, for example, with three additional sensors 122 in the opposite directions along the x-axis direction 174, the y-axis direction 176, and the z-axis direction 178, thereby enabling less rotation 180 of the sensor array 172 to complete its measurement. As such, the measuring device 116 may not need to be adjusted to direct any sensors 122 in the opposite directions along the x-axis direction 174, the y-axis direction 176, and the z-axis direction 178. In some embodiments, the sensor array 172 may include one or two sensors 122 and enable automatically or manually adjusting the sensor array 172 to direct the one or two sensors 122 in different directions to fully and accurately measure the dimensions of the room 170.

Turning back to FIG. 5, the measuring device 116 may include room dimension determination logic 124 communicatively coupled to the processor 118 that may determine the dimensions of the room based on measurements obtained by the one or more sensors 122. In some embodiments, the room dimension determination logic 124 may receive measured dimensions from the one or more sensors 122, for example, via sensor data indicative of measured length, measured width, and/or measured height of the room. Based on the measured dimensions, the room dimension determination logic 124 may then determine one or more additional dimensions, such as square footage and/or cubic footage, of the room.

Thus, to facilitate determining dimensions of the room, in some embodiments, the room dimension determination logic 124 may receive an indication of the shape of the room. For example, the room dimension determination logic 124 may receive an indication that the room has a rectangular floor plan shape and/or a rectangular prism three-dimensional shape. When the room has a rectangular floor plan shape, the room dimension determination logic 124 may determine square footage of the room by multiplying together its measured length and its measured width. Additionally or alternatively, when the room has a rectangular prism three-dimensional shape, the room dimension determination logic 124 may determine cubic footage of the room by multiplying together its measured length, its measured width, and its measured height.

As discussed in further detail below, in some embodiments, the room dimension determination logic 124 may include predefined room shapes 126, for example, stored in memory 120 and/or selectable by the HVAC system installer. Additionally or alternatively, the room dimension determination logic 124 may include custom room shape logic 128, for example, that enables the HVAC system installer to define custom or unique room shapes. To facilitate adapting operation of the HVAC system to the room, in some embodiments, dimensions and/or shape of the room may be associated, for example, with a room identifier and stored in memory 120.

It should be understood that the use of the term "logic" in the present disclosure may refer to any suitable implementation or medium, such as in hardware or circuitry and/or as software or one or more software applications. In other words, the room dimension determination logic 124 may be implemented as hardware, software, or a combination of hardware and software elements.

The measuring device 116 may also include a communication interface 130 communicatively coupled to the processor 118 that may enable the measuring device 116 to communicate data, for example, with the mobile device 112 via one or more data signals. The measuring device 116 may include a user interface 132 that enables the measuring device 116 to display output and/or receive input from, for example, the HVAC system installer.

The mobile device 112 may be any suitable electronic device, such as a smartphone, a wearable device, a tablet, a laptop, a personal computer, and/or the like. In any case, the mobile device 112 may include a processor 134 and memory 136 communicatively coupled to the processor 134. In some embodiments, the processor 134 may generally control operation of the mobile device 112, for example, by executing corresponding instructions stored in memory 136. In addition to storing executable instructions, in some embodiments, the memory 136 may store data to be processed by the processor 134, such as room dimensions, room shape, room identifiers, and/or a building layout.

The mobile device 112 may include building layout determination logic 138 communicatively coupled to the processor 134 that may determine the dimensions and layout of the building that includes the room based on the measurements obtained by the one or more sensors 122 of the measuring device 116. In some embodiments, the building layout determination logic 138 may receive dimensions and shapes corresponding to multiple rooms of the building from the measuring device 116, for example, as determined by the room dimension determination logic 124 of the measuring device 116. Additionally or alternatively, the building layout determination logic 138 may include room dimension determination logic 140 communicatively coupled to the processor 134 that may determine the dimensions of the room based on measurements received from the measuring device 116, for example, obtained by the one or more sensors 122 of the measuring device 116.

In some embodiments, the mobile device 112 may not be communicatively coupled to the measuring device 116. As such, the room dimension determination logic 140 may enable the HVAC system installer to manually enter dimensions of the room and/or determine dimensions of the room, for example, based on dimensions of other rooms previously supplied or input to the mobile device 112, as explained in more detail below.

The building layout determination logic 138 may enable selecting and/or determining locations of the rooms with respect to each other to determine the building layout. For example, the building layout determination logic 138 may enable the HVAC system installer to select locations of the rooms with respect to each other via any suitable technique, such as dragging-and-dropping graphical representations of the rooms, using arrow keys, and/or the like. Additionally or alternatively, the building layout determination logic 138 may automatically estimate the locations of the rooms with respect to each other based on the shapes of the rooms. The building layout determination logic 138 may then enable the HVAC system installer to modify the estimation the locations of the rooms.

The building layout determination logic 138 may determine dimensions of the building based on the dimensions and/or shapes of the rooms of the building as received from the measuring device 116 and/or determined by the room dimension determination logic 140. As a simple example, the building layout determination logic 138 may add up the cubic footage of the rooms to determine the cubic footage of the building.

In some embodiments, the building layout determination logic 138 may enable the HVAC system installer to identify each room of the building, for example, as a bathroom, a bedroom, and/or the like, to facilitate HVAC zone operation. That is, the HVAC system 114 may enable different operation, for example, providing more or less air, heating, and/or cooling in different zones. Each zone may be associated with a set of rooms based on, for example, sizes of the rooms, occupancy of the rooms, likelihood of occupants being in the rooms, time of day, location of the rooms, and/or the like.

The mobile device 112 may also include a communication interface 146 communicatively coupled to the processor 134 that may enable the mobile device 112 to communicate data and/or commands, for example, with the measuring device 116 and/or the HVAC system 114 via data signals and/or command signals. The mobile device 112 may include a user interface 148 that enables the mobile device 112 to display output and/or receive input from, for example, the HVAC system installer.

The HVAC system 114 may include any suitable HVAC system, such as those described above. As described with reference to FIG. 4, the HVAC system 114 may include the control panel 82 that regulates operation of the HVAC system 114. The control panel 82 may include the microprocessor 86 and the non-volatile memory 88. As illustrated, the non-volatile memory 88 may store zone information 150 of the building, which may enable the HVAC system 114 to operate differently, for example, providing more or less air, heating, and/or cooling to different zones. In some embodiments, the zone information 150 may include room dimensions 152, such as cubic footage, square footage, measured length, measured width, and/or measured height of each room. Additionally, in some embodiments, the zone information 150 may include room identities 154, for example, which indicate whether each room is a kitchen, bathroom, master bedroom, laundry room, or living room. Furthermore, in some embodiments, the zone information 150 may include room schedules 156, for example, which indicate times and/or days of the week when each room is likely or expected to be occupied.

The HVAC system 114 may also include the VSD 92 and the motor 94. The HVAC system 114 may further include a communication interface 158 communicatively coupled to the control panel 82 that may enable the HVAC system 114 to communicate data and/or commands, for example, with the mobile device 112 via data signals and/or command signals.

The processors 118, 134, 86 of the measuring device 116, the mobile device 112, and the HVAC System 114, respectively, may execute software programs and/or instructions relating to measuring room dimensions, determining building layouts, and/or operating HVAC systems. Moreover, the processors 118, 134, 86 may each include one or more microprocessors, one or more "general-purpose" microprocessors, one or more special-purpose microprocessors, and/or one or more application specific integrated circuits (ASICS), or some combination thereof. For example, the processors 118, 134, 86 may include one or more reduced instruction set (RISC) processors.

The memory devices 120, 136, 88 of the measuring device 116, the mobile device 112, and the HVAC System 114, respectively, may store information such as control software, look up tables, configuration data, and/or the like. The memory devices 120, 136, 88 may include a tangible, non-transitory, machine-readable-medium, such as volatile memory, a random access memory (RAM), nonvolatile memory, and/or read-only memory (ROM). The memory devices 120, 136, 88 may include one or more storage devices, such as nonvolatile storage devices that may include read-only memory (ROM), flash memory, a hard drive, and/or any other suitable optical, magnetic, or solid-state storage medium. The memory devices 120, 136, 88 may store a variety of information and may be used for various purposes. For example, the memory devices 120, 136, 88 may store machine-readable and/or processor-executable instructions as firmware and/or software. By executing the instructions, the processors 118, 134, 86 may determine room dimensions, determine building layouts, and/or control operation of an HVAC system.

The communication interfaces 130, 146, 158 of the measuring device 116, the mobile device 112, and the HVAC System 114, respectively, may enable communication with any suitable communication network. For example, the communication interfaces 130, 146, 158 may enable the measuring device 116, the mobile device 112, and the HVAC System 114, respectively, to communicate with a wireless network, such as a mobile network and/or a WiFi network. In this manner, the communication interfaces 130, 146, 158 may enable the measuring device 116, the mobile device 112, and the HVAC System 114 to communicate with each other.

The user interfaces 132, 148 of the measuring device 116 and the mobile device 112, respectively, may enable the measuring device 116 and the mobile device 112 to display output and/or receive input from the HVAC system installer. For example, the user interfaces 132, 148 may include any suitable input and output devices, such as displays, touchscreens, styluses, keypads, and the like, to enable the HVAC system installer to receive information and perform operations associated with measuring room dimensions and/or determining building.

Figure 7:
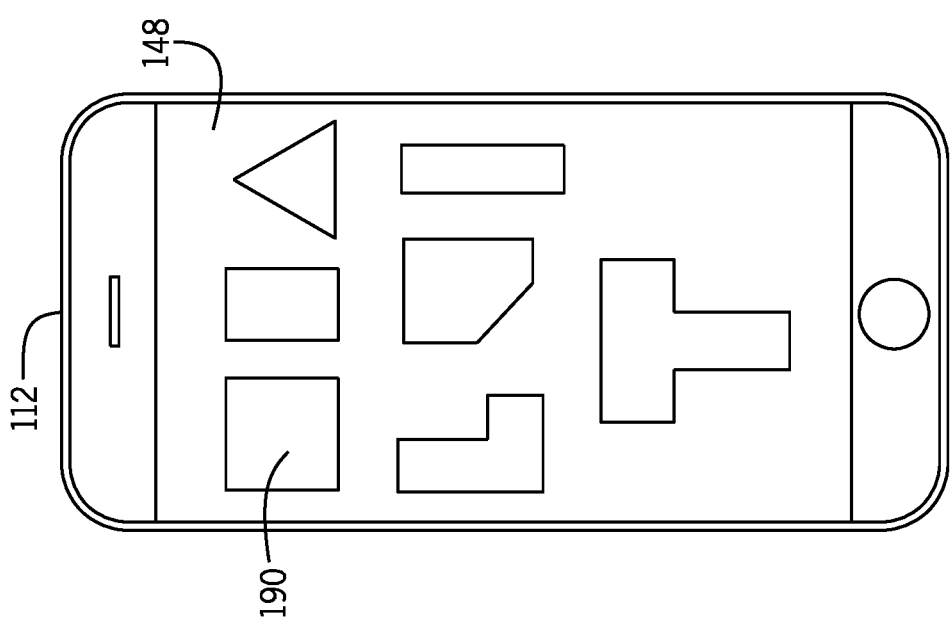
FIG. 7 illustrates an example of a graphical user interface (GUI) displayed on the mobile device of FIG. 5, in accordance with an embodiment of the present disclosure.

FIG. 7 illustrates an example of a mobile device 112, which may be implemented in the system 110 of FIG. 5. As illustrated, the user interface 148 may display one or more predefined shapes 190. In some embodiments, the HVAC system installer may have previously generated and/or selected the predefined shapes 190 displayed by the user interface 148. The HVAC system installer may select the predefined shape that best approximates the shape of the room, for example, via touch or any other suitable input technique or device. When the mobile device 112 is communicatively coupled to the measuring device 116, the measuring device 116 may then determine the dimensions of the room based on the predefined shape selected by the HVAC system installer. While FIG. 7 illustrates the mobile device 112 enabling selection of the predefined shape of the room, the measuring device 116 may also enable selection of the predefined shape of the room as shown in FIG. 7 via the user interface 132 of the measuring device 116.

Figure 8:
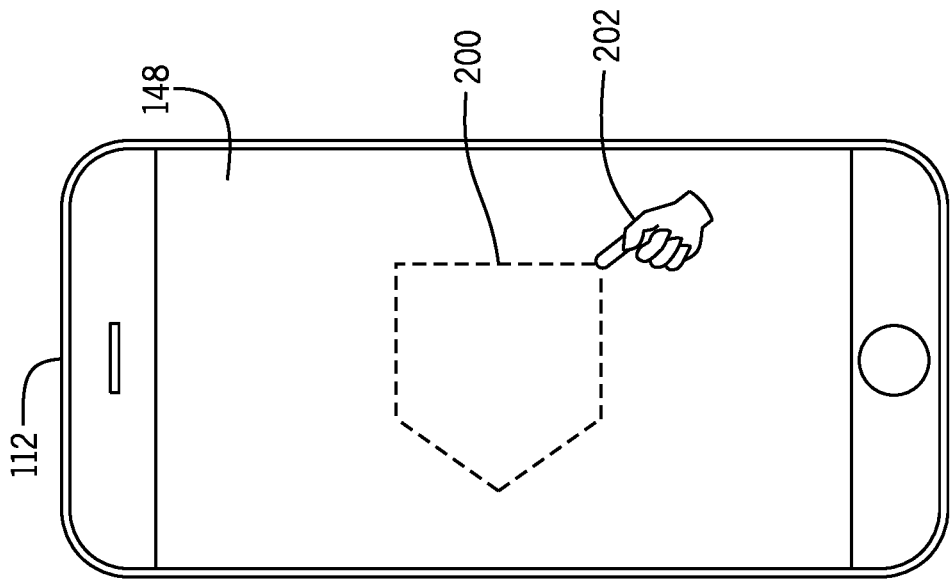
FIG. 8 illustrates another example of a graphical user interface (GUI) displayed on the mobile device of FIG. 5, in accordance with an embodiment of the present disclosure.

FIG. 8 illustrates another example of a mobile device 112, which may be implemented in the system of FIG. 5. As illustrated, the user interface 148 may enable the HVAC system installer to draw the custom shape 200, for example, by dragging his finger 202 on the user interface 148. Additionally or alternatively, the HVAC system installer may use any other suitable input technique or device, such as a stylus, a mousing device, arrow keys, and/or the like, to draw the custom shape 200. When the mobile device 112 is communicatively coupled to the measuring device 116, the measuring device 116 may then determine the dimensions of the room based on the custom shape drawn by the HVAC system installer. While FIG. 8 illustrates the mobile device 112 enabling selection of the generation of the custom shape 200 of the room, the measuring device 116 may also enable generation of the custom shape 200 of the room as shown in FIG. 8 via the user interface 132 of the measuring device 116.

Figure 9:
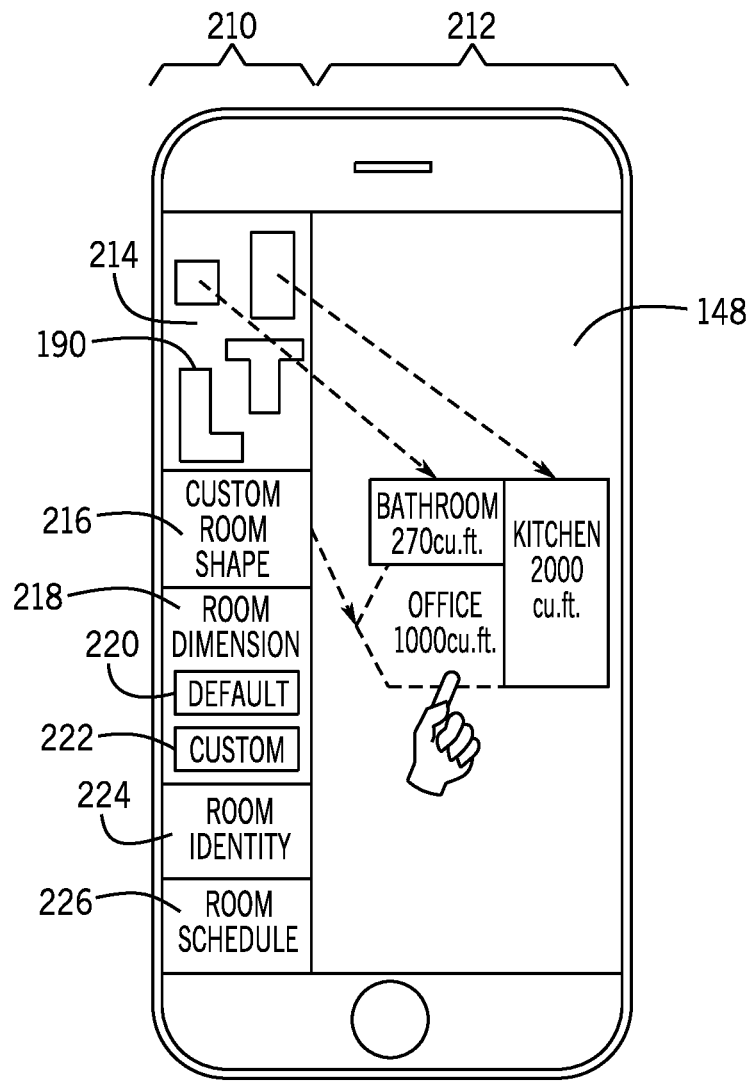
FIG. 9 illustrates another example of a graphical user interface (GUI) displayed on the mobile device of FIG. 5, in accordance with an embodiment of the present disclosure.

FIG. 9 illustrates another example of a mobile device 112, which may be implemented in the system of FIG. 5 of FIG. 5. As illustrated, the user interface 148 may include an entry pane 210 and a layout pane 212. The entry pane 210 may enable the HVAC system installer to enter parameters related to a room of a building, such as shape, dimension, identity, schedule, and/or the like. The layout pane 212 may display the rooms and the layout of the building as the room parameters are entered by the HVAC system installer.

The entry pane 210 may include a predefined room shape tool 214 that enables the HVAC system installer to select a predefined shape 190 corresponding to a room, as described in FIG. 7. The entry pane 210 may also include a custom room shape tool 216 that enables the HVAC system installer to draw a custom room shape 200 corresponding to a room, as described in FIG. 8. In any case, once the room shape is determined, the HVAC system installer may enter a dimension of the room via a room dimension tool 218.

As illustrated, the room dimension tool 218 may include a default selection 220 and a custom selection 222. The default selection 220 may provide a default dimension of the room that may be based on the room shape input by the HVAC system installer and/or other rooms already displayed in the layout pane 212. For example, if a room has a shape that is square and shares a side that is 10 feet with a neighboring room that is also square and has a height of 10 feet, then the default selection 220 for cubic footage of the room may be 10 feet×10 feet×10 feet. The custom selection 222 may enable the HVAC system installer to manually enter or adjust the dimensions of the room.

The entry pane 210 may include any suitable other tools that enable the HVAC system installer to enter information about a room that may be relevant to HVAC functions. For example, the entry pane 210 may include a room identity tool 224 that may enable the HVAC system installer to enter an identity of the room. For example, the HVAC system installer may identify a room as a kitchen, a master bedroom, a master bathroom, an office, a study, a living room, a closet, or the like. The entry pane 210 may also include a room schedule tool 226 that may enable the HVAC system installer to enter a schedule for the room. In some embodiments, the HVAC system installer may enter day and/or time information corresponding to when the room is expected to be occupied, unoccupied, and/or the like.

The layout pane 212 may also enable the HVAC system installer to move one or more displayed room to more accurately reflect the true layout of the building. For example, the layout pane 212 may enable the HVAC system installer to move rooms to match the true layout of the building via dragging-and-dropping. As such, the tools of the entry pane 210 and the layout pane 212 may enable the HVAC system installer to supply information, such as building layout, room shape and dimensions, room identity, room schedule, and/or occupancy, to operate the HVAC system 114 more efficiently, without using a measuring device 116.

Figure 10:
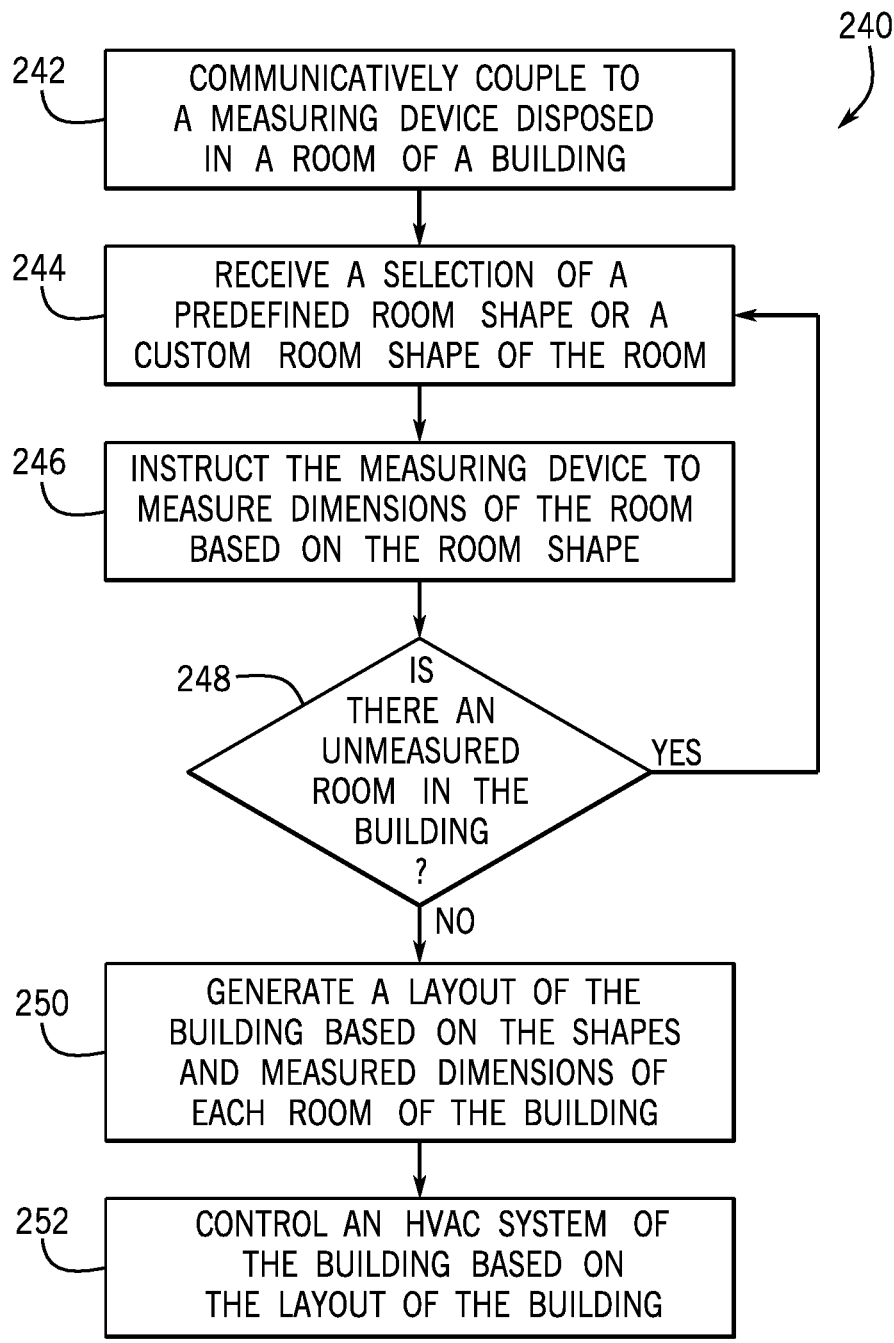
FIG. 10 is a flow diagram of a process for controlling operation of the HVAC system of FIG. 1 based on measurements received from the measuring device of FIG. 5, in accordance with an embodiment of the present disclosure.

With the foregoing in mind, FIG. 10 is a flow diagram of a process 240 for determining a building layout using the measuring device 116 and the mobile device 112 and controlling the HVAC system 114 of FIG. 5, in accordance with an embodiment of the present disclosure. The process 240 may be performed by any suitable device that may communicatively couple to the measuring device 116, receive a selection of a predefined room shape or a custom room shape, instruct the measuring device 116 to measure dimensions of a room, generate a layout of a building based on room shapes and dimensions, and control the HVAC system 114 based on the layout of the building, such as the processor 134 of the mobile device 112, the processor 118 of the measuring device 116, and/or the microprocessor 86 of the HVAC system 114. While the process 240 is described using steps in a specific sequence, it should be understood that the present disclosure contemplates that the described steps may be performed in different sequences than the sequence illustrated, and certain described steps may be skipped or not performed altogether. In some embodiments, the process 240 may be implemented by executing instructions stored in a tangible, non-transitory, computer-readable medium, such as the memory 136, using a processor, such as the processor 134. These instructions may be in the form of a software application or "app" stored and executed on the mobile device 112.

As illustrated, the processor 134 may communicatively couple, at process block 242, to a measuring device disposed in a room of a building. In particular, the processor 134 of the mobile device 112 may instruct the communication interface 146 to communicatively couple to the communication interface 130 of the measuring device 116.

The processor 134 may then receive, at process block 244, a selection of a predefined room shape or a custom room shape of the room. In particular, the HVAC system installer may select the predefined room shape 126 using the user interface 132 of the measuring device 116 or select the predefined room shape 142 using the user interface 148 of the mobile device 112, as shown in FIG. 7. The processor 134 of the mobile device 112 may then receive the selection of the predefined room shape 126, 142. In some embodiments, the HVAC system installer may draw a custom room shape using the custom room shape logic 128 of the measuring device 116 or the custom room shape logic 144 of the mobile device 112, as shown in FIG. 8. The processor 134 of the mobile device 112 may then receive the custom room shape.

The processor 134 may instruct, at process block 246, the measuring device 116 to measure dimensions of the room based on the room shape. For example, the measuring device 116 may measure length, width, and/or height of the room. The measuring device 116 may then associate these measurements with the room shape, for example, using the room dimension determination logic 124. If the room shape is a rectangle, the measuring device 116 may associate the longer of the length and width measurement with the longer side of the rectangle and the shorter of the length and width measurement with the shorter side of the rectangle. The measuring device 116 may determine cubic footage of the room, for example, by using the room dimension determination logic 124 to multiply the length, width, and height measurements together. In some embodiments, the measuring device 116 may send the measurements or one or more signals indicating the measurements to the mobile device 112 and the processor 134 may then associate the measurements with the room shape and/or determine the cubic footage of the room, for example, using the room dimension determination logic 140.

The processor 134 may then determine, at decision block 248, whether there is an unmeasured room in the building. If so, the processor 134 may repeat process blocks 244 and 246 and decision block 248 for each unmeasured room.

If the processor 134 determines that there is not an unmeasured room in the building, then all rooms of the building have been measured, and the processor 134 may generate, at process block 250, a layout of the building based on the shapes and measured dimensions of each room of the building. In particular, the processor 134 may instruct the building layout determination logic 138 to automatically determine where each room is located in relation to other rooms in the building and/or enable the HVAC system installer to select where each room is located. In some embodiments, the processor 134 may instruct the building layout determination logic 138 to automatically determine room identities and/or room schedules/occupancy. Additionally or alternatively, the processor 134 may instruct the building layout determination logic 138 to enable the HVAC system installer to manually select or input the room identities and/or room schedules/occupancy.

The processor 134 may then control, at process block 252, the HVAC system 114 based on the layout of the building. In particular, the processor 134 may control the HVAC system 114 to operate based on size of the rooms, location of the rooms, purpose of the rooms, occupancy of the rooms, time of day, and/or the like. For example, the processor 134 may control the HVAC system 114 to provide more air, heating, and/or cooling to larger rooms or rooms that are more often occupied, such as common rooms during the day and/or bedrooms during the night. In this manner, the process 240 may enable more efficient and targeted operation of the HVAC system 114.

Figure 11:
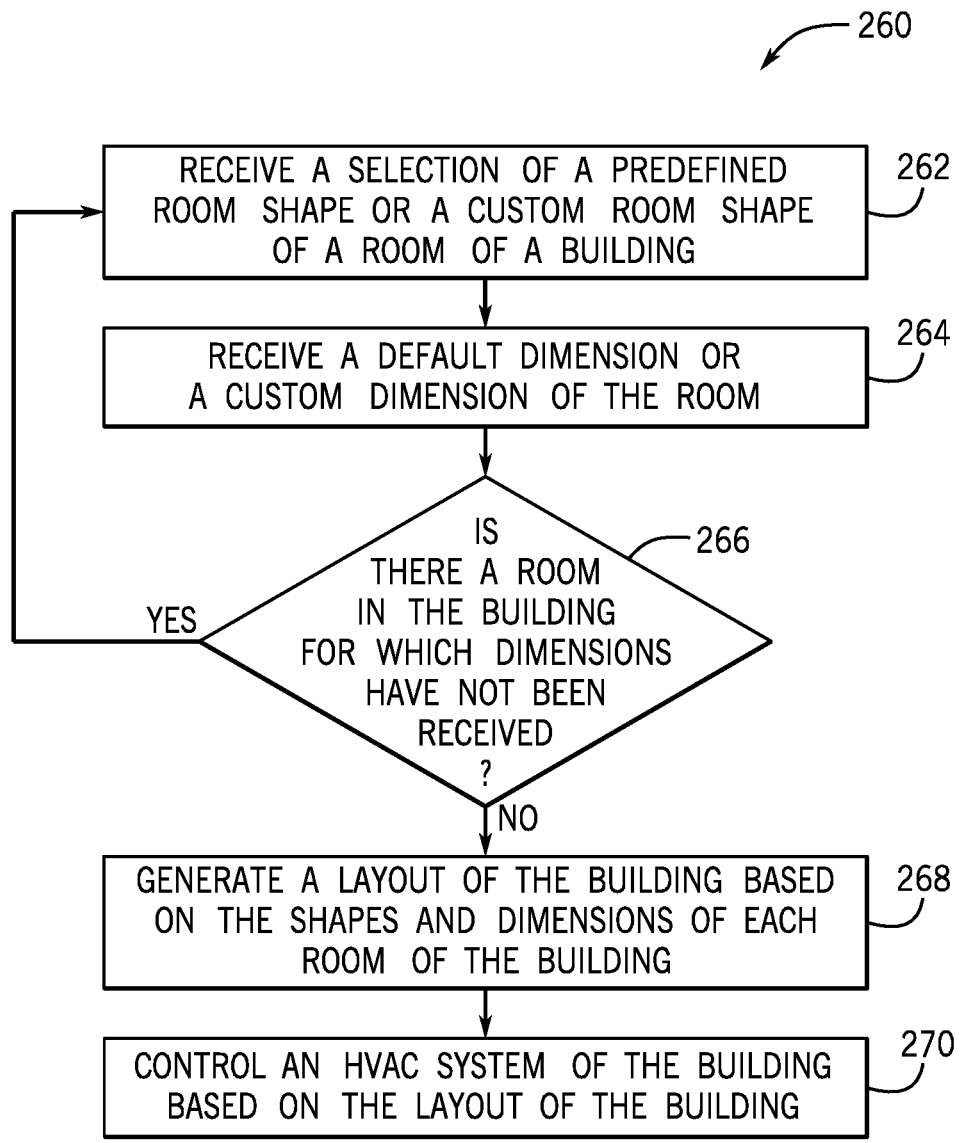
FIG. 11 is a flow diagram of another process for controlling operation of the HVAC system of FIG. 1 without using measurements received from the measuring device of FIG. 5, in accordance with an embodiment of the present disclosure.

Additionally or alternatively, FIG. 11 is a flow diagram of a process 260 for determining a building layout using the mobile device 112 and controlling the HVAC system 114 of FIG. 5, without using the measuring device 116, in accordance with an embodiment of the present disclosure. The process 260 may be performed by any suitable device that may receive a selection of a predefined room shape or a custom room shape, generate a layout of a building based on room shapes and dimensions, and control the HVAC system 114 based on the layout of the building, such as the processor 134 of the mobile device 112, the processor 118 of the measuring device 116, and/or the microprocessor 86 of the HVAC system 114. While the process 260 is described using steps in a specific sequence, it should be understood that the present disclosure contemplates that the described steps may be performed in different sequences than the sequence illustrated, and certain described steps may be skipped or not performed altogether. In some embodiments, the process 260 may be implemented by executing instructions stored in a tangible, non-transitory, computer-readable medium, such as the memory 136, using a processor, such as the processor 134. These instructions may be in the form of a software application or "app" stored and executed on the mobile device 112.

As illustrated, the processor 134 may receive, at process block 262, a selection of a predefined room shape or a custom room shape of the room. In particular, the HVAC system installer may select the predefined room shape 190 using the predefined room shape tool 214 displayed by the user interface 148 of the mobile device 112, as shown in FIG. 9. The processor 134 of the mobile device 112 may then receive the selection of the predefined room shape 190. In some embodiments, the HVAC system installer may draw a custom room shape 200 using the custom room shape tool 216 displayed by the user interface 148 of the mobile device 112, as shown in FIG. 9. The processor 134 of the mobile device 112 may then receive the custom room shape 200.

The processor 134 may then receive, at process block 264, a default dimension or a custom dimension of the room. In particular, the HVAC system installer may select the default selection 220 of the room dimension tool 218 displayed by the user interface 148 of the mobile device 112, as shown in FIG. 9. The processor 134 of the mobile device 112 may then determine the default dimension of the room, for example, based on the room shape selected or drawn by the HVAC system installer and/or dimensions of other rooms already displayed in the layout pane 212. In some embodiments, the HVAC system installer may select the custom selection 222 displayed by the user interface 148 of the mobile device 112, as shown in FIG. 9. The processor 134 of the mobile device 112 may then enable the HVAC system installer to manually enter the dimensions of the room, which may be received by the processor 134.

The processor 134 may determine, at decision block 266, whether there is a room in the building for which dimensions have not been received. If so, the processor 134 may repeat process block 262, process block and 264, and decision block 266 for each room in the building for which dimensions have not yet been received.

If the processor 134 determines that there is not a room in the building for which dimension have not been received, then dimensions for all rooms of the building have been received, and the processor 134 may generate, at process block 268, a layout of the building based on the shapes and measured dimensions of each room of the building. In some embodiments, the processor 134 may instruct the building layout determination logic 138 to automatically determine where each room is located in relation to each other in the building. Additionally or alternatively, the processor 134 may instruct the building layout determination logic 138 to enable the HVAC system installer to select where each room is located. Furthermore, in some embodiments, the processor 134 may instruct the building layout determination logic 138 to automatically determine room identities and/or room schedules/occupancy. Additionally or alternatively, the processor 134 may instruct the building layout determination logic 138 to enable the HVAC system installer to select the room identities and/or room schedules/occupancy.

The processor 134 may then control, at process block 270, the HVAC system 114 based on the layout of the building. In particular, the processor 134 may control the HVAC system 114 to operate based on size of the rooms, location of the rooms, purpose of the rooms, occupancy of the rooms, time of day, and the like. For example, the processor 134 may control the HVAC system 114 to provide more air, heating, and/or cooling to larger rooms or rooms that are more often occupied, such as common rooms during the day and/or bedrooms during the night. In this manner, the process 260 may enable more efficient and targeted operation of the HVAC system 114.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system for determining a layout of a building, the system comprising:
   a device configured to:
      determine a respective outline of each enclosed space of a plurality of enclosed spaces within the building;
      determine respective dimensions of each enclosed space of the plurality of enclosed spaces; and
      automatically generate the layout of the building based on the respective dimensions and outlines of the plurality of enclosed spaces, wherein the respective dimensions and outlines are only of the enclosed spaces, wherein automatically generating the layout of the building comprises adding up cubic footage of the plurality of enclosed spaces to determine cubic footage of the building, and wherein automatically generating the layout of the building is configured to improve heating, ventilating, and air conditioning (HVAC) system installation and operational efficiency of the HVAC system.

2. The system of claim 1, wherein the device is communicatively coupled to conditioned air equipment of the building, and wherein the device is configured to control operation of the conditioned air equipment based on the layout of the building.

3. The system of claim 1, wherein the device is configured to determine the respective dimensions of each enclosed space of the plurality of enclosed spaces based on the respective outline of each enclosed space of the plurality of enclosed spaces.

4. The system of claim 1, wherein determining the respective outline of each enclosed space of the plurality of enclosed spaces comprises receiving a respective outline of each enclosed space of the plurality of enclosed spaces.

5. The system of claim 1, wherein the device is configured to automatically determine respective locations of the plurality of enclosed spaces with respect to each other based on the outlines of the plurality of enclosed spaces.

6. The system of claim 1, wherein the device is configured to automatically determine respective identities of the plurality of enclosed spaces.

7. The system of claim 3, wherein the device is configured to determine the respective dimensions of each enclosed space of the plurality of enclosed spaces based on the respective outline and scan inputs related to a respective boundary of each enclosed space of the plurality of enclosed spaces received from an input device configured to scan the respective boundary of each enclosed space of the plurality of enclosed spaces.

8. The system of claim 4, wherein the device is configured to receive the respective outline of each enclosed space of the plurality of enclosed spaces as an input based on a selection from a plurality of predefined outlines displayed on a user interface.

9. The system of claim 4, wherein the device is configured to receive the respective outline of each enclosed space of the plurality of enclosed spaces as an input based on a drawing drawn via a user interface.

10. A system for determining a layout of a building, the system comprising:
    an input device configured to scan a respective boundary of each enclosed space of a plurality of enclosed spaces within the building; and
    a processor configured to:
       receive scan inputs related to the respective boundaries from the input device;
       determine a respective outline of each enclosed space of the plurality of enclosed spaces;
       determine respective dimensions of each enclosed space of the plurality of enclosed spaces; and
       automatically generate the layout of the building based on the respective dimensions and outlines of the plurality of enclosed spaces, wherein the respective dimensions and outlines are only of the enclosed spaces, wherein automatically generating the layout of the building comprises adding up cubic footage of the plurality of enclosed spaces to determine cubic footage of the building, and wherein automatically generating the layout of the building is configured to improve heating, ventilating, and air conditioning (HVAC) system installation and operational efficiency of the HVAC system.

11. The system of claim 10, wherein the processor is configured to determine the respective dimensions of each enclosed space of the plurality of enclosed spaces based on the scan inputs.

12. The system of claim 10, wherein the processor is configured to determine the respective outline by receiving the respective outline of each enclosed space of the plurality of enclosed spaces.

13. The system of claim 10, wherein the processor is communicatively coupled to conditioned air equipment of the building, and wherein the processor is configured to control operation of the conditioned air equipment based on the layout of the building.

14. The system of claim 11, wherein the processor is configured to determine the respective dimensions of each enclosed space of the plurality of enclosed spaces based on the scan inputs and the respective outline of each enclosed space of the plurality of enclosed spaces.

15. The system of claim 12, wherein the processor is configured to receive the respective outline of each enclosed space of the plurality of enclosed spaces via an input based on a selection from among a plurality of predefined outlines displayed on a user interface.

16. The system of claim 12, wherein the processor is configured to receive the respective outline of each enclosed space of the plurality of enclosed spaces via an input received, via a user interface, of a drawing of the respective outline drawn on the user interface.

17. An electronic device, comprising:
a processor configured to:
generate a respective layout for each enclosed space of a plurality of enclosed spaces within a building to establish a plurality of enclosed space layouts;
automatically generate a layout of the building based on the enclosed space layouts and both respective dimensions and shapes of each enclosed space of the plurality of enclosed spaces, wherein the respective dimensions and outlines are only of the enclosed spaces, wherein automatically generating the layout of the building comprises adding up cubic footage of the plurality of enclosed spaces to determine cubic footage of the building, and wherein automatically generating the layout of the building is configured to improve heating, ventilating, and air conditioning (HVAC) system installation and operational efficiency of the HVAC system; and
control conditioned air equipment based on the layout of the building.

18. The electronic device of claim 17, wherein the processor is configured to receive the respective dimensions and a respective shape of each enclosed space of the plurality of enclosed spaces from an input device.

19. The electronic device of claim 18, wherein the processor is configured to receive the respective shape via an input received, from the input device, of a selection of the shape from among a plurality of predefined shapes displayed on the input device.

20. The electronic device of claim 18, wherein the processor is configured to receive the respective shape via an input received, from the input device, of a drawing of the shape drawn on the input device.

* * * * *